(12) United States Patent
Zhao (10) Patent No.: US 10,749,872 B2
(45) Date of Patent: Aug. 18, 2020

(54) METHOD AND DEVICE FOR CONTROLLING RESOURCE ACCESS

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 106 days.

(21) Appl. No.: 15/559,296

(22) PCT Filed: Apr. 11, 2017

(86) PCT No.: PCT/CN2017/080035
§ 371 (c)(1),
(2) Date: Sep. 18, 2017

(87) PCT Pub. No.: WO2018/018933
PCT Pub. Date: Feb. 1, 2018

(65) Prior Publication Data
US 2018/0262512 A1  Sep. 13, 2018

(30) Foreign Application Priority Data
Jul. 29, 2016 (CN) .......................... 2016 1 0620599

(51) Int. Cl.
*G06F 21/00* (2013.01)
*H04L 29/06* (2006.01)
*H04L 29/08* (2006.01)

(52) U.S. Cl.
CPC .......... *H04L 63/102* (2013.01); *H04L 29/08* (2013.01); *H04L 63/12* (2013.01); *H04L 63/20* (2013.01); *H04L 67/12* (2013.01); *H04L 67/18* (2013.01)

(58) Field of Classification Search
CPC .......... H04N 21/2665; H04N 21/4622; H04N 21/472; H04N 21/4722; H04N 21/478;
(Continued)

(56) References Cited

U.S. PATENT DOCUMENTS 6,510,515 B1   1/2003  Raith
8,601,125 B2 * 12/2013  Huang .................... H04L 12/14
                                                              709/223
(Continued)

FOREIGN PATENT DOCUMENTS

CN          1312990 A    9/2001
CN          1921404 A    2/2007
(Continued)

OTHER PUBLICATIONS

International Search Report of PCT/CN2017/080035 in Chinese, dated Jul. 4, 2017 with English translation.
(Continued)

*Primary Examiner* — Kendall Dolly
(74) *Attorney, Agent, or Firm* — Collard & Roe, P.C.

(57) ABSTRACT

A method and device for controlling resource access, wherein the method includes: receiving a requester's access request for a target resource; performing verification for the access request; and determining whether to allow the requester to access the target resource; wherein the verification for the access request includes: determining validity of a service state related to the target resource.

19 Claims, 9 Drawing Sheets

(58) Field of Classification Search
CPC ............. H04N 21/482; H04N 21/4821; H04N 21/8586; H04L 29/08; H04L 63/102; H04L 63/20; H04L 67/18; H04L 63/12; H04L 67/12; H04L 67/32
See application file for complete search history.

(56) References Cited

U.S. PATENT DOCUMENTS

| | | | |
|---|---|---|---|
| 8,856,299 B2* | 10/2014 | Hu | H04L 12/14 709/223 |
| 9,197,577 B2* | 11/2015 | Chai | H04L 12/14 |
| 9,762,580 B2* | 9/2017 | Belling | H04L 63/20 |
| 2006/0153073 A1* | 7/2006 | Ghiware | H04W 12/08 370/230 |
| 2007/0003034 A1* | 1/2007 | Schultz | G06Q 20/40 379/114.01 |
| 2008/0141333 A1* | 6/2008 | Chen | G06F 21/6218 726/1 |
| 2008/0256606 A1* | 10/2008 | Koikara | G06F 21/604 726/4 |
| 2009/0182883 A1* | 7/2009 | Giaretta | G06Q 40/00 709/228 |
| 2009/0187498 A1 | 7/2009 | Kim et al. | |
| 2009/0264097 A1* | 10/2009 | Cai | G06O 30/04 455/406 |
| 2010/0217877 A1* | 8/2010 | Willars | H04W 4/24 709/228 |
| 2013/0067568 A1* | 3/2013 | Obasanjo | H04L 63/0807 726/20 |
| 2016/0006837 A1* | 1/2016 | Reynolds | H04W 84/18 709/203 |
| 2016/0226732 A1* | 8/2016 | Kim | H04W 12/0401 |
| 2017/0237742 A1* | 8/2017 | Salmela | H04L 63/101 726/4 |
| 2017/0286038 A1* | 10/2017 | Li | G06F 3/14 |
| 2018/0321993 A1* | 11/2018 | McClory | H04L 41/5041 |
| 2018/0332120 A1* | 11/2018 | Castro Castro | H04L 12/14 |
| 2019/0132412 A1* | 5/2019 | Chen | H04L 67/16 |
| 2019/0289648 A1* | 9/2019 | Kim | H04L 41/0803 |
| 2019/0294477 A1* | 9/2019 | Koppes | G06F 9/5072 |

FOREIGN PATENT DOCUMENTS

| | | |
|---|---|---|
| CN | 101150853 A | 3/2008 |
| CN | 104270326 A | 1/2015 |
| WO | 2009/051527 A1 | 4/2009 |

OTHER PUBLICATIONS

Notice of Transmittal of the International Search Report of PCT/CN2017/080035 in Chinese, dated Jul. 4, 2017.
Written Opinion of the International Searching Authority of PCT/CN2017/080035 in Chinese, dated Jul. 4, 2017 with English translation of relevant parts.
Chinese Office Action in Chinese Application No. 201610620599.8, dated Apr. 23, 2020 with English translation.
"Design of network washing machine controller", Wuyi University Challenge Cup winning works collection, Wang Ke, Guangdong People's Publishing House, Apr. 2008 with English Abstract (24 pages).

* cited by examiner

METHOD AND DEVICE FOR CONTROLLING RESOURCE ACCESS

CROSS REFERENCE TO RELATED APPLICATIONS

This application is the National Stage of PCT/CN2017/080035 filed on Apr. 11, 2017, which claims priority under 35 U.S.C. § 119 of Chinese Application No. 201610620599.8 filed on Jul. 29, 2016, the disclosure of which is incorporated by reference.

TECHNICAL FIELD

The present disclosure relates to network technology, and particularly relates to a method and device for controlling resource access.

BACKGROUND

With the development of network technologies, a variety of applications are promoted by constantly making use of abundant network sources, which brings great convenience for people's demands for work and life. Especially, the proposal of concept of "Internet+" highly integrates Internet with various traditional industries, and new development ecology is created. By taking the Internet business as an example, a traditional business, such as telephone service, hotel business, leasing activities, etc., is defined mainly in time as a dimension. After the user handles related businesses, corresponding resources can be accessed within expiration date of a business.

However, known resource management for the business takes only factors such as time (for example, accessible period of time), position (accessed GPS scope) or IP address (accessed IP address) into consideration, without considering the state of the business per se.

SUMMARY

According to a first aspect of the present disclosure, a method for controlling resource access is proposed, comprising: receiving a requester's access request for a target resource; performing verification for the access request; and determining whether to allow the requester to access the target resource; wherein verification for the access request includes: determining validity of a service state related to the target resource.

According to a second aspect of the present disclosure, a method for accessing a resource is provided, comprising: transmitting a access request for a target resource; waiting during verification of the access request; and receiving a response indicating whether to allow access to the target resource; wherein the access request includes an identifier for triggering verification of a service state of the target resource.

According to a third aspect of the present disclosure, a resource access control device is proposed, comprising: a receiver, configured to receive a requester's access request for a target source; a processor, configured to perform verification for the access request for, wherein the verification for the access request includes determining validity of a service state related to the target resource; and a transmitter, configured to transmit a response indicating whether to allow the requester to access the target resource according to a result of the verification for the access request.

According to a fourth aspect of the present disclosure, a resource access device is proposed, comprising: a transmitter, configured to transmit an access request for a target resource; a receiver, configured to receive a response used for indicating whether to allow access to the target resource; and a processor, configured to add an identifier used for triggering verification for a service state of the target resource to the transmitted access request, and control the resource access device to access the target resource when the receiver receives a response of allowing access to the target resource.

To solve the above problems, present disclosure provides a method and device for controlling resource access, which may control the resource access by considering service states of target resources for the characteristic of flexibility of the Internet and in particular the Internet of things services, so that the reasonableness of access control manner may be raised, configuration of access policies may be simplified, and the user's experience may be enhanced.

BRIEF DESCRIPTION OF THE DRAWINGS

In order to describe technical solutions of embodiments of the present disclosure clearly, figures of the embodiments will be introduced briefly hereinafter. Obviously, the figures described below only relate to some embodiments of the present disclosure, instead of limiting the present disclosure.

DETAILED DESCRIPTION

The technical solutions in the embodiments of the present disclosure will be described clearly and completely referring to the figures. Obviously, the embodiments described below are just a part of embodiments of the present disclosure, but not all the embodiments. Based on the embodiments in the present disclosure, all the other embodiments obtained by those ordinary skilled in the art without any inventive work also belong to the scope sought for protection in the present disclosure.

As known by the inventor(s), there are mainly three manners for resource access control: attribute-based access control, role-based access control, and dynamically authorized access control.

1. In the attribute-based access control, resource access is controlled by setting resource attributes, wherein resource access can be controlled by defining an access control list. The access control list includes a plurality of parameters such as a request initiator that can identify allowance of resource access, related conditions of allowance of resource access, and operation authorities allowed to be executed, etc.

2. In the role-based access control, resource access can be controlled by setting a role, access authorities of different roles are different, the user can be given a plurality of roles, and role control is managed uniformly by a role server.

3. In a dynamically authorized access control, dynamic access control can be realized by dynamically authorizing. On the basis of the two previous access control manners, the requester's application procedures are simplified by realizing dynamic application of access authorities via a dynamic access server (DAS).

Figure 1:
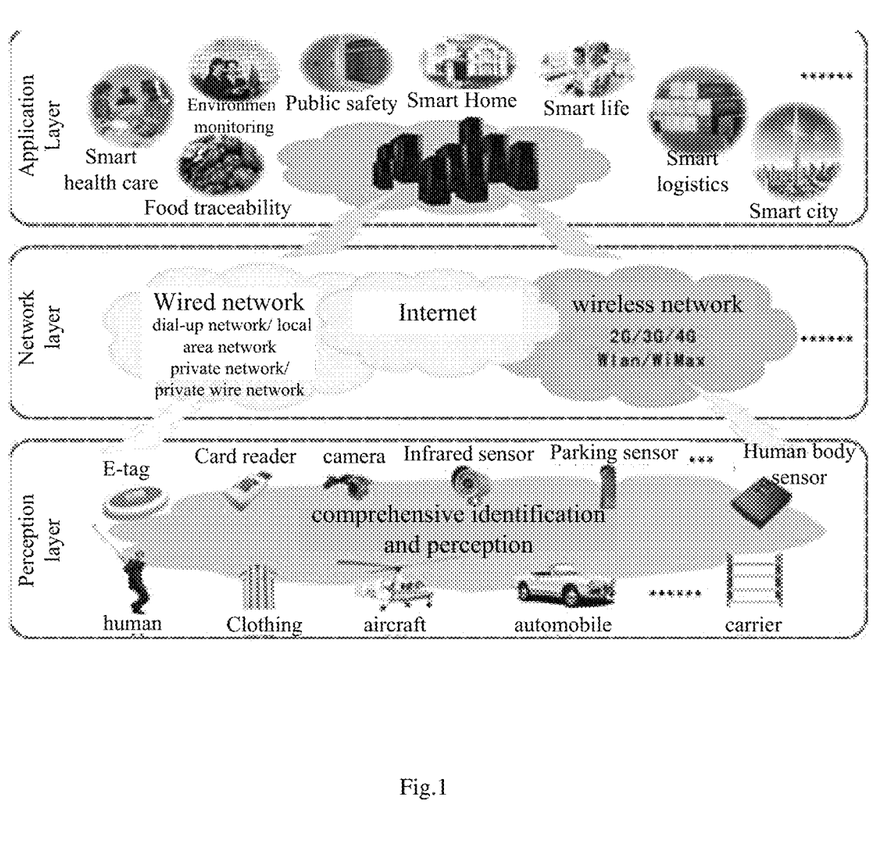
FIG. 1 is a schematic diagram of common architecture of Internet of things.

FIG. 1 is a schematic diagram of common technology architecture of Internet of things. As shown in FIG. 1, the Internet of things can be divided into three layers: a perception layer, a network layer and an application layer; wherein the perception layer is composed of various sensors, including sensing terminals for example an infrared sensor, an electronic tag, a card reader, an inductor, a camera, a GPS and so on, and the perception layer is a source for the Internet of things to identify objects and collect information. The network layer, which is composed of various networks including Internet, TV network, network management system, cloud computing platform and so on, is a central pivot of the entire Internet of things, and the network layer is in charge of delivering and processing information obtained from the perception layer. The application layer is an interface of the Internet of things and the user. It combines with industry requirements and implements intelligent application of the Internet of things.

Figure 2:
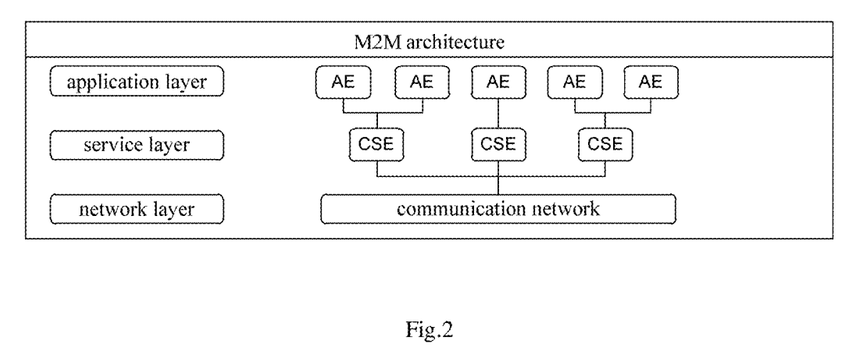
FIG. 2 is schematic diagram that corresponds to a logic structure of FIG. 1.

Correspondingly, as shown in FIG. 2, at the application layer corresponding to the M2M architecture, application entities (AE) in various devices and sensors provide management applications and standardized interfaces interactive with the applications; at a service layer corresponding between the application layer and the network layer, a common service entity (CSE) supports resource sharing and interoperability. One of advantages of such architecture lies in that it connects "producer" of data with "consumer" of data in a safe manner, and configurable policies can be utilized to define which applications and which users can access which devices and sensors. In other words, by configuring resource access control policies, it can be determined whether to provide corresponding resource in response to a requester's request for accessing resource.

As described above, existing resource access control manners consider time factors such as accessible time, role time, etc., position factors such as GPS range of an accessed application, network address factors such as IP address of the accessed application and so on, which satisfies pre-paid service resource access control demand, but resource access of many post-paid services is not separately determined by time, position, etc. It needs to control resource access by taking consideration of the states of services.

Therefore, resource access control by considering the operating state of the service is proposed according to the embodiments of the present disclosure. Principles of the embodiments of the present disclosure will be described below in detail under the framework of the Internet of things (M2M). In particular, the illustration for how to control resource access with respect to the service state of the resource is described by taking the application entity AE under M2M as a requester that sends a request for accessing the resource and by taking the common service entity (CSE) as a server providing corresponding resource. However, it should be understood that the principles of the present disclosure are not limited to such specific situation. In fact, M2M provides a mechanism for controlling access of the source and service provided by the CSE and AE. In the case of adopting other network architectures and network protocols, the principles of the present disclosure can also be realized. Therefore, the principles of the present disclosure are not limited to the application entities and the common service entities applicable to the Internet of things but can be applicable to any appropriate network entity for controlling network resource access.

In one embodiment of the present disclosure, parameters corresponding to the application entity AE in access control policy <accessControlPolicy> resource are expanded, so as to instruct that it is necessary to consider the service state when the resource access is controlled. In fact, CSE can also use the accessControlPolicy (ACP) to control resource access. In the present embodiment, the resource access control list is modified so as to control the resource access based on the service state corresponding to the resource. In particular, the resource <accessControlPolicy> includes attributes <privileges> and <selfPrivileges> representing a set of access control rules. Then, the set of access control rules defines which entities have authorities to execute some operations under a designated context (accessControlContexts) and the CSE uses this set of rules to make a decision to access a specific resource.

As shown in the following Table 1, the parameter accessControlContexts in attribute privileges in the resource <accessControlPolicy> is expanded, and a sub-parameter accessControlServiceState is added, which indicates whether the service state need to be considered in an access control. For example, 1 represents that the service state need to be considered in the access control while 0 represents that the service state need not to be considered in the access control. In addition, accessCOntrolServicerule can also be added to represent a preset service information rule, wherein the service information rule includes information of at least one of various service states within a life cycle of the service.

TABLE 1

| Name | Description |
| --- | --- |
| accessControlTimeWindow | Representing a time range, and defining a time range relative to the time when the host CSE receives a request |
| accessControlLocationRegion | Representing a location range, and defining a location relative to receipt of a request |
| accessControlIpIPAddress | Representing an IP address range, and defining an IP address relative to receipt of a request |
| accessControlServiceState | Representing service state, wherein 1 represents that the access control considers the |

TABLE 1-continued

| Name | Description |
| --- | --- |
| | service state, and 0 represents that the access control does not consider the service state |
| accessControlServicerule | Representing a specific service information rule |

Figure 3:
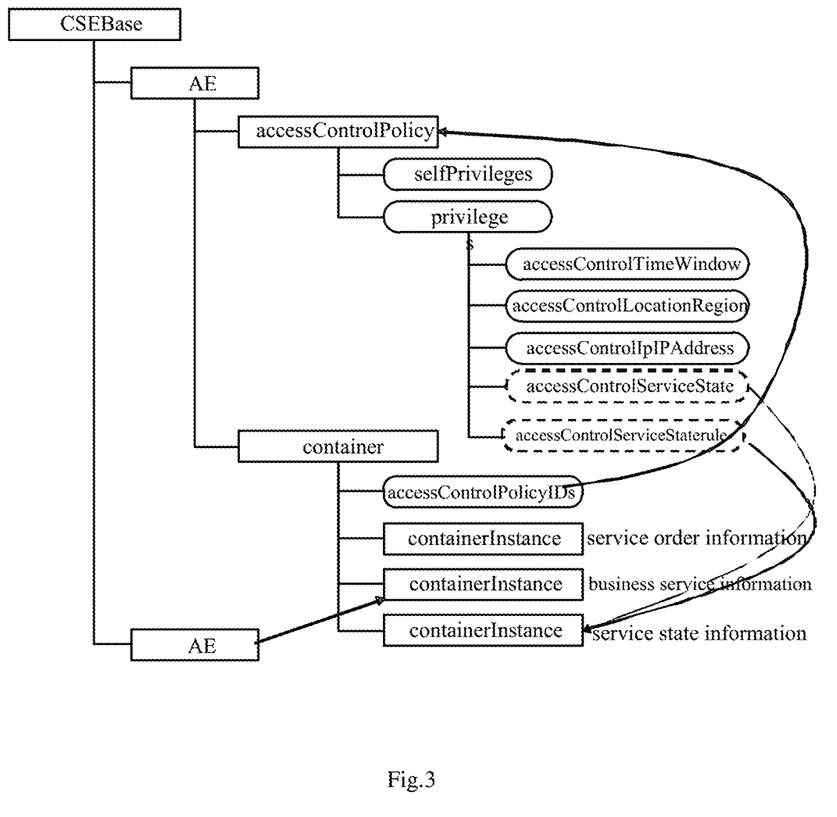
FIG. 3 is a schematic diagram of a source structure of AE established under CSEBase according to an embodiment of the present disclosure.

FIG. 3 schematically shows a resource structure of an AE established under CSEBase. As shown in FIG. 3, a sub-parameter accessControlServiceState is added to the attribute <privileges> of the source <accessControlPolicy> of AE, and service state information can be saved in a sub-resource <containerinstance> of a resource <container>. An attribute accessControlPolicy of the resource <container> includes an identifier list of the source <accessControlPolicy>. Authorities defined in the resource <accessControlPolicy> determine who is allowed to accesses a resource including this attribute for all intents and what his purpose is (for example, obtaining, updating, deleting, etc.). The resource <container> of AE can be used to share information with other entities and potentially track data. Thus, the service state information saved in the sub-resource <containerInstance> of the resource <container> of AE can be obtained by other AEs. As an example, information such as service order information, business service information about AE can be included in the sub-resource <containerInstance>.

Figure 4:
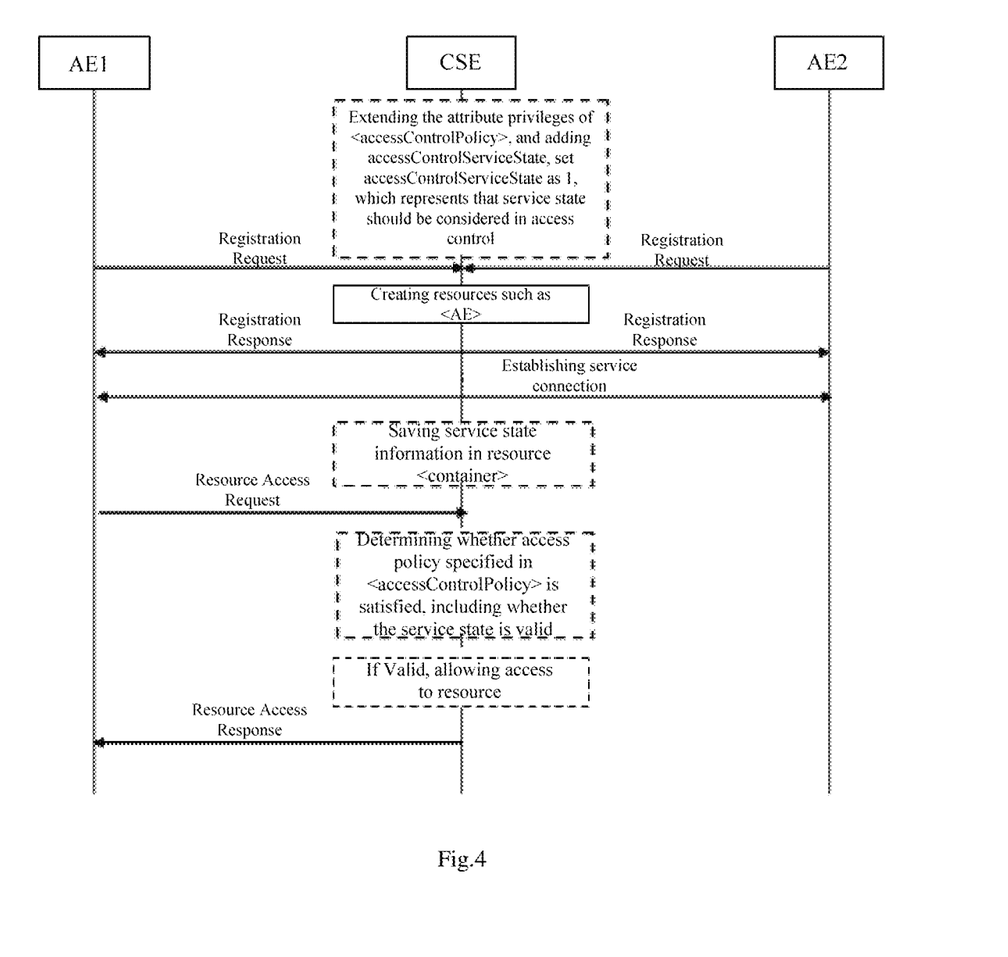
FIG. 4 shows a schematic process for controlling resource access according to one embodiment of the present disclosure.

FIG. 4 shows a schematic process for controlling resource access according to one embodiment of the present disclosure. As shown in FIG. 4, when a request for accessing resource sent from an AE is received, CSE determines whether access policy specified in <accessControlPolicy> is satisfied, including determining whether a service state related to the target resource is valid or not. If the service state of the target resource is valid, the resource access is allowed; otherwise, the resource access is not allowed. In the case of the resource access is allowed, the CSE would transmit a resource access response to the AE.

Optionally, according to a resource access request received from the AE, the CSE determines whether a sub-parameter accessControlServiceState of the attribute <privileges> of the resource <accessControl Policy> corresponding to the AE is set. If this sub-parameter is set, it is necassary to consider a service state related to the resource to be accessed.

Optionally, the CSE compares the saved information of the service state with a preset service information rule, so as to verify the validity of the service state related to the target resource.

Optionally, the service information rule includes information corresponding to various states of the service. For example, the various states of the service can include but not limited to: a user's reservation for the service has been finished, the user has paid advance charge for the service, the service is being executed for the user, the service has been executed and finished but the user has not paid for the service yet, the service has been executed and finished and the user has paid for the service. Optionally, for some services, for example, video on demand, if a related service state indicates that the user has submitted a request for viewing a video but the user has not paid for the video yet, the user's request for viewing the video is rejected; if the related service state indicates that the user has paid the advance charge, the user can be allowed to view editing of the video; if the related service state indicates that the user has paid the video in full, the user can be allowed to view the entire video.

Optionally, the service information rule can further include personal information of the target users of the service. For example, then range of target users of the service are users older than 18, the service has set priorities based on the previous consumption level of the user, or the service sets authorities for the user, for example, video downloading, commenting or information promoting about new products. Optionally, if the saved service state information indicates that the user's age is under 18, the resource access request of the AE is rejected; or if the saved information of the service state indicated that the user's priority is higher than a priority threshold corresponding to the service, the resource access request of the AE can be allowed; or if the saved information of the service state indicates that the authorities of the user is lower, user's request for commenting or the user's request for subscribing information of new products is not accepted.

Optionally, the service information rule can be used in combination or can be used alone, to which no limitation is made.

Optionally, which kind of access control policy needs to be adopted with respect to the AE can be determined according to the received resource access request from the AE and the access control policy associated with the target resource to which the AE wants to access. For example, other sub-parameters such as <accessControlTimeWindow>, <accessControlLocationRegion>, or <acces sControlIpIPAddress> of the attribute <privileges> of the resource <accessControlWindow> corresponding to the AE can be considered to make a response to the resource access request of the AE on the basis of taking consideration of the service states. In the case of determining that the AE satisfies the access policies specified by the accessControlPolicy, a resource access response is transmitted to the AE, allowing the AE to access the target resource.

Optionally, if the AE does not establish service connection with the CSE before, a registration request can be transmitted to the CSE through the AE so as to establish a corresponding connection. In particular, as shown in FIG. 4, the AE transmits the registration request to the CSE, and after receiving the registration request of the AE and verifying the AE, the CSE establishes a corresponding resource for the AE. In order to realize the resource access control mechanism according to the service state as described above, in the resource established for the AE, to the parameter accessControlContexts of the attribute privileges of the resource <accessControlPolicy> is expanded, and the sub-parameter accessControlServiceState is added to the parameter accessControlContexts so as to indicate that it is necessary to consider the service state of the target resource when controlling the resource access. In addition, the sub-resource <containerInstance> of the resource <container> established for the AE can be used to save the service state information. In response to the registration request of the AE, after having created the corresponding resource, the CSE transmits a registration response to the AE, such that a service connection is established between CSE and AE. Optionally, as shown in FIG. 4, two AEs, i.e., AE1 and AE2, transmit the registration request to the CSE, respectively, so that the CSE creates the corresponding resources <AE1> and <AE2> respectively, and transmits the registration responses to the AE1 and AE2, so as to establish service connections with AE1 and AE2 respectively.

As shown in FIG. 4, after having established the service connection with the CSE, the CSE can obtain the service state information timely, and the related service state information can be saved in the sub-resource <containerInstance> of the resource <container> of the corresponding AE. In addition, as described above, the resource <container> of the AE can be used to share information with other entities and potentially track data, so that the AE1 and AE2 can obtain the service state information saved in the sub-resource <containerInstance> of the resource <container> of each other.

According to the above embodiments of the present disclosure, by extending the resource access control list and adding the access control service state identifier, when the resource access request of the requester is processed, it can be determined whether to accept the requester's access to the target resource by considering the service operating state corresponding to the target resource, which raises reasonableness of the access control manner, and makes the user's experience diversified.

Additionally, according to another embodiment of the present disclosure, a resource access control method is proposed, wherein when the resource access is controlled, not only the service state of the requester's corresponding target resource is considered, but also the role of the requester is considered. That is, it can determined whether to accept the requester's resource access request by considering the service operating state of the resource and the role allocated to the requester. For this purpose, as shown in the following Table 2, the structure of the resource <role> can be extended, to which a service dependence identifier serviceDependence is added.

TABLE 2

| Attribute of <role> | Multi-plicity | RW/RO/WO | Description |
|---|---|---|---|
| issuer | 1 | WO | An identifier which is in charge of allocating a role to an entity of AE or CSE |
| holder | 1 | WO | An identifier of AE or CSE to which the role is allocated |
| notBefore | 1 | WO | A start time for the role which can be used for the access control |
| notAfter | 1 | WO | An end time for the role which can be used for the access control |
| serviceDependence | 0 ... 1 | WO | Service state dependence |
| accessControlServicerule | 0 ... n | RW | Representing a specific service information rule |
| roleName | 0 ... 1 | WO | A readable name of <role> |
| tokenLink | 0 ... 1 | RW | The attribute includes recitation of a token in which the role allocation is described. |

Optionally, the service dependence identifier serviceDependence indicates whether the service state needs to be considered in the access control. For example, 1 represents that the resource access control depends on the service state, while 0 represents that the resource access control does not depend on the service state. In addition, accessControlServucerule can be added to represent a preset service information rule, wherein the service information rule includes information of at least one of the respective service states within the life cycle of the service.

Figure 5:
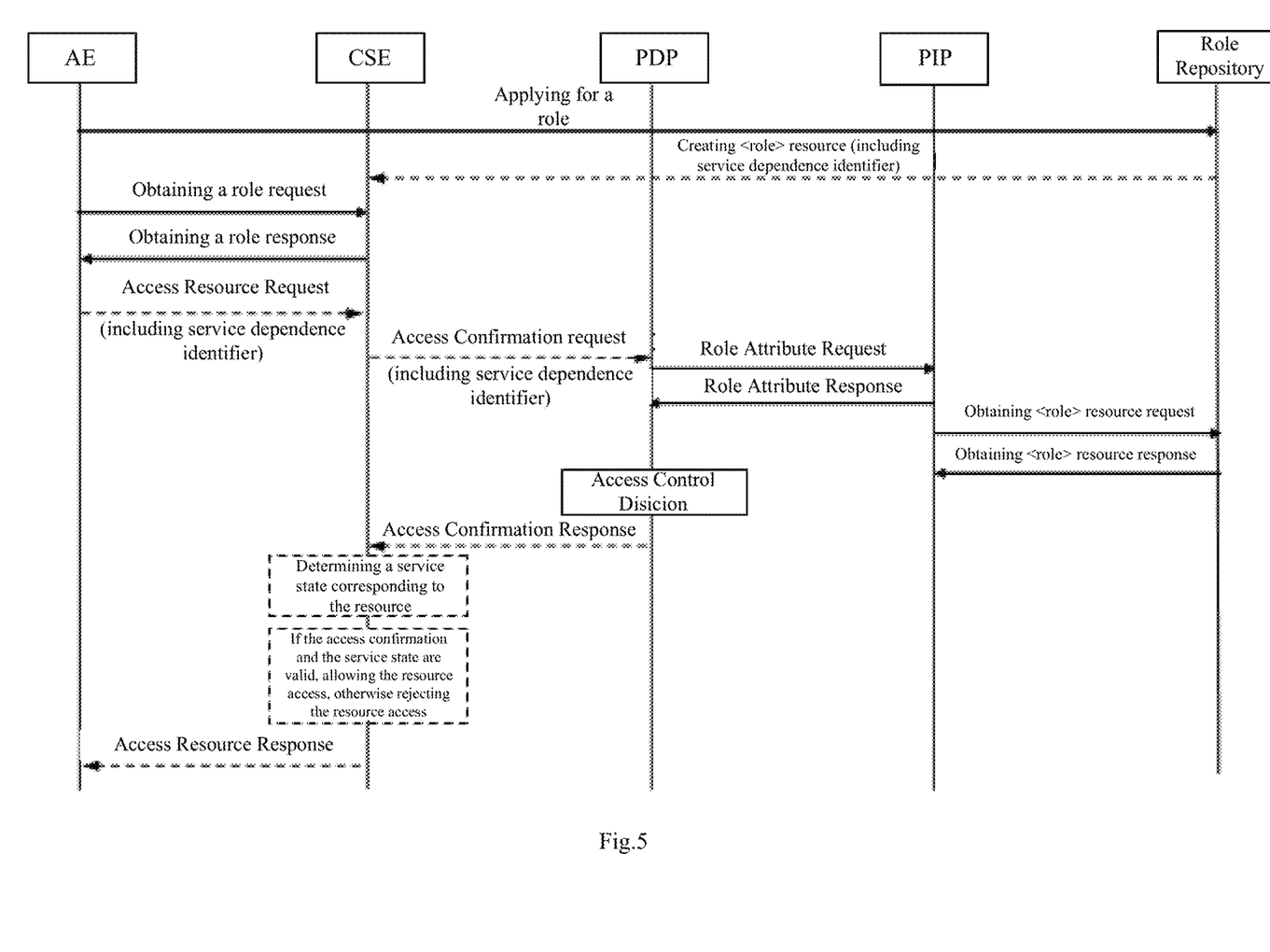
FIG. 5 shows a schematic process for controlling resource access according to another embodiment of the present disclosure.

Description is given below in detail referring to FIG. 5. As shown in FIG. 5, in a situation of controlling based on the role, the role information of the requester should be verified when the resource access request transmitted from the requester (for example, AE) is received. In particular, the requester AE sends a resource access request, the role information of the AE is included in the resource access request, wherein the role information includes a service dependeninece identifier used to indicate that the resource access control depends on the service state and other attributes related to AE such as the role ID of the AE and so on. When receiving the resource access request sent by the AE, the host CSE transmits the access confirmation request to PDP (Policy Decision Point), wherein the role information related to the AE is included. In other words, the host CSE transmits an access control decision request to PDP. When receiving the access confirmation request sent by CSE, PDP can transmit a Role attribute request to PIP (Policy Information Point) according to the role information of the AE included therein, so that the PIP obtains <role> resource information corresponding to the AE from a role repository. When having received a response of obtaining the <role> resource from the role repository and obtained the <role> resource information related to the AE, the PIP transmits it to the PDP as a response of the role attribute. In this way, the PDP has obtained role allocation information previously allocated to the AE from the role repository according to the role ID of the AE. After that, the PDP will verify the role of the requester AE and make an access control decision according to the role and service state. Optionally, the verification can include but not limited to: whether the role is released by an valid authority party, whether the owner of the role is the same as the requester, and whether the role is still valid, etc. In the case that verification is passed, PDP will make an access control decision, and transmit an access confirmation response to the CSE. After receiving the access confirmation response, the CSE can determine the service state corresponding to the resource. In particular, the CSE, as a host, determines whether the service state related to the requested target resource is valid or not, and at the same time determine whether to allow the resource access by considering the access control decision transmitted by the PDP. If the service state of the resource is valid and the PDP returns a decision of allowing the resource access, then the CSE allows the AE to access to the resource, and transmits a positive resource access response to the AE. Optionally, the CSE determines whether to take consideration of the service state when controlling the resource access according to the service state identifier included in the resource access request of the AE received previously. For example, if the service state identifier indicates that there is no need to consider the service state for the target resource, the CSE can allow the AE to access the target resource according to the positive access control decision sent by the PDP; otherwise, if the service state identifier indicates that it is necessary to take consideration of the service state for the target resource, the CSE would determine whether the related service state corresponding to the target resource is valid or not; and if the related service state is valid and the positive access control decision sent by the PDP is received, the resource access is allowed; otherwise, if the related service state is invalid or the positive access control decision is not received, the CSE would reject the resource access request of the AE, and does not allow the AE to access the target resource.

It shall be noted that although FIG. 5 illustrates CSE, PDP, and PIP as three independent entities respectively, PDP and PIP can also be integrated in the CSE to take it as a whole, which is not limited by the embodiments of the present disclosure.

Optionally, if a role is not allocated to the initiator AE before, in order to implement role-based resource access control, a role can be allocated to the AE in the following ways. In particular, as shown in FIG. 5, the AE can transmit a request for applying for a role to a role authority party, for example, the role repository, or the CSE as the host. The role authority party determines whether the role can be allocated to the initiator (for example, the AE as the requestor) according to the role allocation policy. Optionally, the authority party can allocate a role to the initiator directly. Thus, the role authority party creates a corresponding resource <role> under the CSE registered by the initiator AE. As described above, in order to take consideration of the service state corresponding to the target resource in the role-based resource access control, the parameter service-Dependentce parameter is included in the created resource <role>. Optionally, its value can be preset as 1, so as to indicate that the service state corresponding to the resource is considered when the resource access control is performed in the case of default. Later, the initiator AE can obtain the allocated resource <role> from the CSE, so as to obtain information about the role allocated by the role authority party.

As described above, in the present embodiment, when the resource access request transmitted by the initiator AE is received, it can be determined whether the service dependence identifier serviceDependence included therein is set or not, so as to trigger consideration of the service state of the target resource when the resource access is controlled. If it is confirmed that serviceDependence is set to indicate consideration of the service state, it is necessary to determine the validity of the service state corresponding to the resource.

In the determination of the validity of the service state, similar situations described by referring to the embodiments of the present disclosure can be adopted. For example, service operating state related to the target resource is obtained through the CSE and compared with the preset service information rule, so as to determine the validity of the service state of the target resource.

Optionally, except illustrations in the above embodiments of the present disclosure, the service information rule can further include operating states of the service, for example, starting, running, ending, etc. By taking the situation of smart home as an example, the user can control operation of a washing machine through the Internet of things remotely. For example, the washing machine can be configured to apply a dedicated node AND-AE through an embedded application program and be in wireless connection with a smart mobile phone of the user, which can be configured as the initiator AE, via a home gateway, which can be configured as a CSE exchanging data with a service platform. In this example, the initiator AE transmits a resource access request to the CSE to request for accessing the target resource so as to control the washing machine. The CSE firstly verifies the role of the initiator AE (corresponding to the application of the smart mobile phone), and if the role information of the AE matches with the role information allocated to the AE through the service platform, the verification can be passed. In addition, in order to realize that the AE accesses the target resource, for example, controlling the washing machine, it further needs to verify the validity of the service state corresponding to the target resource according to the service information rule according to the embodiment of the present disclosure. For example, in the present example, the service information rule can include but not limited to following service state information: a washing program such as a standard washing, a fast washing, a soft washing or a strong washing is not set yet; the washing program has been already set but when to start the washing machine is not set yet; the washing machine has been started and which procedure is being performed, for example washing, rinsing, dehydrating. Thus, the CSE can allow the initiator AE (for example, the application of the smart mobile phone) to perform the corresponding resource access according to the service state corresponding to the target resource, for example, realizing a corresponding operation. For example, when the service state is that the washing procedure is not set, the AE can be allowed to set a corresponding washing procedure according to the user's requirements; if the washing procedure has been ser but the washing machine is not started yet, then the AE can be allowed to modify the washing procedure or set the start time of the washing machine; or, if the washing machine has been started, then the AE can be allowed to obtain the washing state of the washing machine and change the procedure of one step according to the requirement.

According to the above described embodiments of the present disclosure, by extending the structure of resource <role> and adding the service dependence identifier service-Dependence, when performing process on the resource access request of the requestor, it can be determined whether to accept the requester's access to the target resource by considering the service operating state corresponding to the target resource, which raises reasonableness of the access control manner, and makes the user's experience diversified.

Figure 6:
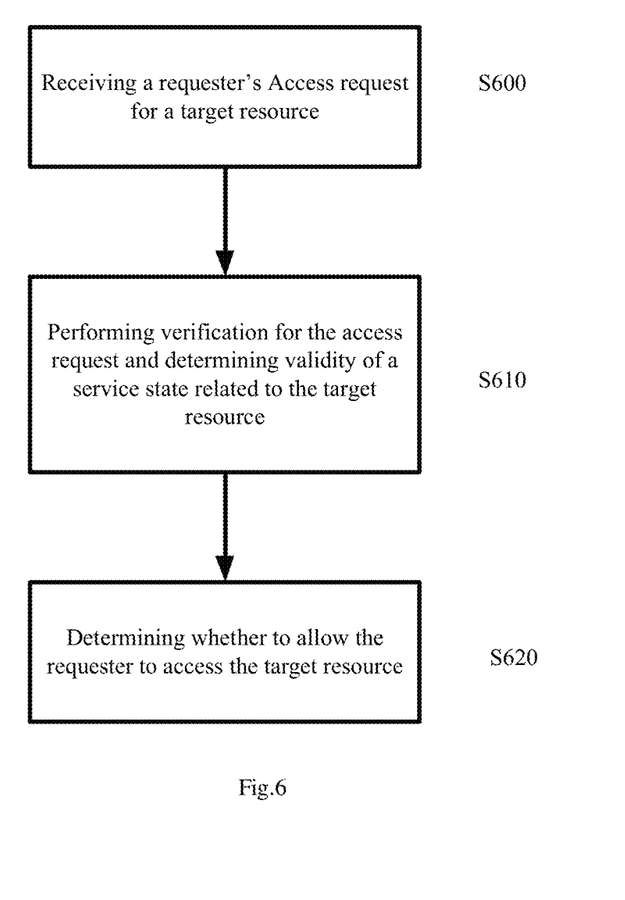
FIG. 6 shows a schematic flow of a method for controlling resource access according to an embodiment of the present disclosure.

FIG. 6 shows a schematic flow of a method for controlling resource access according to an embodiment of the present disclosure. As shown in FIG. 6, the method comprises: S600, receiving a requester's access request for a target resource; S610, performing verification for the access request; and S620, determining whether to allow the requester to access the target resource; wherein the verification for the access request includes: determining validity of a service state related to the target resource.

Optionally, the method further includes: obtaining and saving information of the service state related to the target resource.

Optionally, the method further includes: comparing saved information of the service state with a preset service information rule, so as to determine the validity of the service state related to the target resource.

Optionally, the service information rule includes information corresponding to various states of a service.

Optionally, the service information rule includes information of target users of the service.

Optionally, the method further includes: transmitting a response for allowing access to the target resource to the requester in the case of determining that the service state related to the target resource is valid.

Optionally, the method further includes: verifying validity of a role of the requester according to the requester's access request.

Optionally, the method further includes: rejecting the requester's access request in the case that validity of the role of the requester is not verified.

Optionally, the method further includes: creating resource related to an access control policy, and adding an access control service state identifier to the resource to indicate whether to perform verification for the validity of the service state related to the target resource.

Optionally, the method further includes: creating a resource related to a role, and adding a service state identifier to the resource to indicate whether to perform verification for the validity of the service state related to the target resource.

Optionally, the method further includes: obtaining role allocation information corresponding to the requester from a role repository to verify the validity of the role of the requester when receiving the requester's access request.

Optionally, various states of the service include at least one of the followings: a user's reservation for the service has been finished, the user has paid advance charge for the service, the service is being executed for the user, the service has been executed and finished but the user has not paid for the service yet, the service has been executed and finished and the user has paid for the service.

Optionally, the information of the target users of the service includes at least one of the followings: allowed range of users participating in the service, priorities of the users participating the service, and authorities of the users participating in the service.

Figure 7:
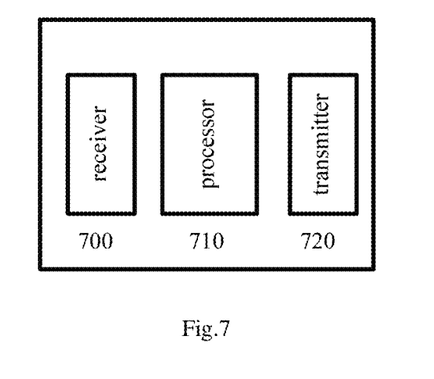
FIG. 7 is a schematic block diagram of a device for controlling resource access according to one embodiment of the present disclosure.

FIG. 7 is a schematic block diagram of a device for controlling resource access according to one embodiment of the present disclosure. As shown in FIG. 7, the device includes: a receiver 700, configured to receive a requester's access request for a target resource; a processor 710, configured to perform verification for the access request, wherein the verification for the access request includes: determining validity of a service state related to the target resource; a transmitter 720, configured to transmit a response of whether to allow the requester to access the target resource according to a result of the verification for the access request.

Optionally, a memory configured to store information of the service state related to the target resource can be disposed inside the device or connected externally to the device.

Optionally, the processor in the device is configured to compare saved information of the service state with a preset service information rule, so as to determine the validity of the service state related to the target resource.

Optionally, the service information rule includes information corresponding to various states of a service.

Optionally, the service information rule includes information of target users of the service.

Optionally, the processor in the device is further configured to instruct the transmitter to transmit a response of allowing to access the target resource to the requester in the case of determining that the service state related to the target resource is valid.

Optionally, the processor in the device is further configured to perform verification for the validity of a role of the requester according the requester's access request.

Optionally, the processor in the device is further configured to reject the requester's access request in the case that validity of the role of the requester is not verified.

Optionally, the processor in the device is further configured to create resource related to an access control policy, and add an access control service state identifier to the resource to indicate whether to perform verification for the validity of the service state related to the target resource.

Optionally, the processor in the device is further configured to create a resource related to a role, and adding a service state identifier to the resource to indicate whether to perform verification for the validity of the service state related to the target resource.

Optionally, the processor in the device is further configured to obtain role allocation information corresponding to the requester from a role repository to verify the validity of the role of the requester when the requester's access request is received.

Figure 8:
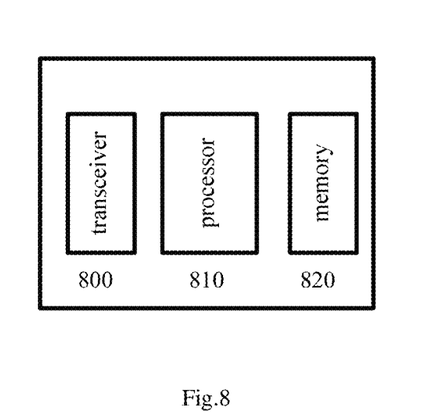
FIG. 8 is a schematic block diagram of a controlling device according to another embodiment of the present disclosure.

FIG. 8 is a schematic block diagram of a control device according to another embodiment of the present disclosure. As shown in FIG. 8, the control device comprises a processor 810, a memory 820 connected to the processor and a transceiver 800, wherein the memory 820 stores instructions, and the processor 810 is configured to execute following steps when instructions stored in the memory 820 are executed: instructing the transceiver 800 to receive a requester's access request for the target resource; performing verification for the access request by the processor 810, wherein the verification for the request for accessing includes: determining validity of a service state related to a target resource; according to a result of the verification for the access request, the processor instructs the transceiver 800 to transmit a response of whether to allow the requester to access the target resource to the requester.

Figure 9:
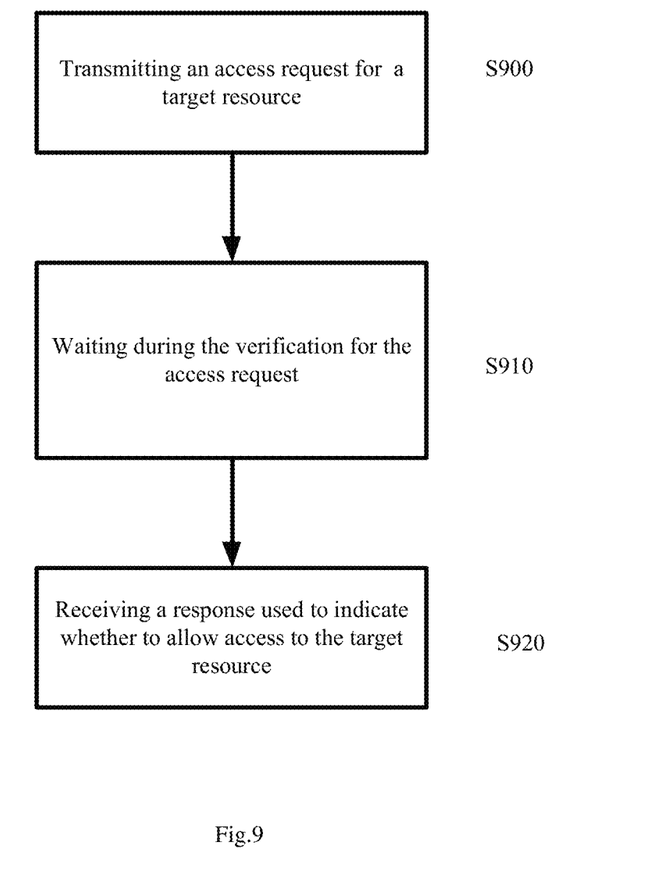
FIG. 9 shows a schematic flow of a method for resource access according to an embodiment of the present disclosure.

FIG. 9 shows a schematic flow of a method for resource access according to an embodiment of the present disclosure. As shown in FIG. 9, the method includes: S900, transmitting an access request for a target resource; S910, waiting during verification of the access request; and S920, receiving a response for indicating whether to allow access to the target resource; wherein an identifier that triggers verification of the service state of the target resource is included in the access request.

Optionally, the identifier is used to trigger a comparison of stored information of the service state related to the target resource with a preset service information rule by a party which receives the access request, so as to determine the validity of the service state related to the target resource.

Optionally, the service state information rule includes information corresponding to various states corresponding to the service.

Optionally, the service state information includes information of target users of the service.

Optionally, the method further includes: an identifier that triggers verification of a role of an access request sender is included in the access request.

Optionally, the method further includes: transmitting a request for creating access control policy resource, wherein a request for adding an access control service state identifier when the request is created in included, so as to indicate whether there is need to verify the validity of the service state of the target resource.

Optionally, the method further includes: transmitting a request for creating role-related resource, wherein a request for adding a service state identifier when the request is created is included, so as to indicate whether there is need to verify the validity of the service state related to the target resource.

Figure 10:
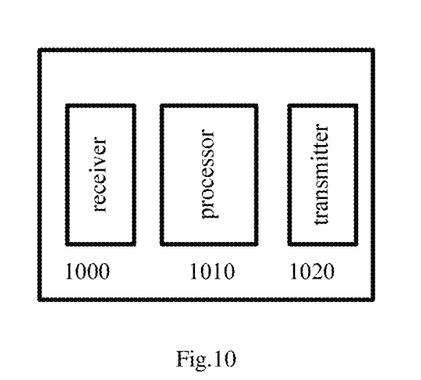
FIG. 10 is a schematic diagram of a resource access device according to an embodiment of the present disclosure.

FIG. 10 is a schematic diagram of a resource access device according to an embodiment of the present disclosure. As shown in FIG. 10, the resource access device comprises: a transmitter, configured to transmit an access request for a target resource; a receiver, configured to receive a response used to indicate allowing to access the target resource; a processor, configured to add an identifier used to trigger a verification for a service state of the target resource to a transmitted access request, and control the resource access device to access the target resource when the receiver received a response of allowing to access the target resource.

Figure 11:
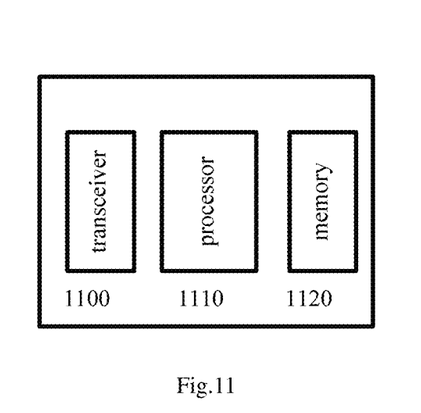
FIG. 11 is a schematic diagram of a resource access device according to an embodiment of the present disclosure.

FIG. 11 is a schematic diagram of a resource access device according to an embodiment of the present disclosure. As shown in FIG. 11, the resource access device comprises: a processor, a memory connected to the processor and a transceiver, wherein the memory stores instructions, the processor is configured to instruct the transceiver to transmit an access request for a target resource when instructions stored in the memory are executed, and control the resource access device to access the target resource when the transceiver receives a response of allowing to access the target resource, wherein the processor adds an identifier that triggers verification of the service state of the target resource to a transmitted access request.

According to the embodiments of the present disclosure, by extending the resource access control list and adding the access control service state identifier, when the resource access request of the requester is processed, it can be determined whether to accept the requester's access to the target resource by considering the service operating state corresponding to the target resource can be combined, which raises reasonableness of the access control manner, and makes the user's experience diversified.

According to the embodiments of the present disclosure, by extending the structure of the resource <role> and adding the service dependence identifier, when the resource access request of the requester is processed, it can be determined whether to accept the requester's access to the target resource based on role verification of the requester and consideration of the service operating state corresponding to the target resource, which raises reasonableness of the access control manner, and makes the user's experience diversified.

Those skilled in the art shall understand that, block diagrams in the description represent conceptive diagrams of descriptive circuits of principles implementing the present disclosure. Likewise, it shall be understood that any flow table, flow diagram, state transition diagram, pseudo code and so on which indicates various processes that can be represented substantially in a computer readable medium and executed by the computer or the processor, regardless whether these computers or processors are displayed explicitly. Written computer readable medium and codes can be realized in a transient state (signal) or in a non-transient state (for example, on tangible media such as CD-ROM, DVD, blue light, hard-disk driver, a flash memory card, or other types of tangible storage medium).

Functions of various elements shown in the figures can be provided by using dedicated hardwares and combining appropriate software and hardware executing the software. When provided by a processor, the function can be provided by a single dedicated processor or a single common processor or some of multiple independent processors that can be shared. Further, explicit use of terms "processor" or "controller" should not be interpreted as exclusively referring to a hardware being capable of executing a software, but can implicitly comprises a digital signal processor ("DSP") hardware, a read only memory ("ROM") for storing the software, a random access memory ("RAM") and a non-volatile memory, without limitation.

Some specific embodiments have been described above. However, it shall be understood that modifications can be made to these embodiments. For example, elements of different embodiments can be combined, supplemented, modified and deleted, so as to obtain other embodiments. In addition, those ordinary skilled in the art shall know that other structures and processing flows can be used to take place of the structures and processing flows which have been disclosed above so as to obtain other embodiments. The other embodiments at least realize the substantially same functions in the substantially same manner, and achieve the substantially same effect provided by the embodiment of the present disclosure. Correspondingly, these and other embodiments shall fall into the scope of the present disclosure.

The present application claims the priority of a Chinese patent application No. 201610620599.8 filed on Jul. 29, 2016, which is hereby incorporated herein by reference in its entirety.

What is claimed is:

1. A computer implemented method for controlling access to resources on a service entity in Internet Of Thing (IOT), comprising:
   receiving a access request initiated by an application entity for a target resource on the service entity;
   performing verification for the access request; and
   determining whether to allow the application entity to access the target resource based on a service operating state corresponding to the target resource;
   wherein performing verification for the access request includes:
   determining validity of a service state related to the target resource based on a service state identifier.

2. The method according to claim 1, further comprising: obtaining information of the service state of the related the target resource.

3. The method according to claim 2, further comprising: comparing the obtained information of the service state with a service information rule, so as to determine the validity of the service state related to the target resource.

4. The method according to claim 3, wherein the service information rule comprises information of at least one of various service states within a life cycle of the service.

5. The method according to claim 3, wherein the service information rule comprises information of target users of the service.

6. The method according to claim 1, further comprising: transmitting a response of allowing the application entity to access the target resource to the application entity in the case of determining the service state related to the target resource is valid.

7. The method according to claim 1, further comprising: verifying validity of access control of the application entity according to the access request.

8. The method according to claim 1, further comprising: verifying validity of a role of the application entity according to the access request.

9. The method according to claim 1, further comprising creating resource related to an access control policy, and adding a service state identifier to the resource to indicate verification of validity of the service state related to the target resource.

10. The method according to claim 7, further comprising: creating a resource related to a role, and adding a service state identifier to the resource to indicate verification of validity of the service state related to the target resource.

11. The method according to claim 8, wherein obtaining role allocation information corresponding to the application entity from a role repository when the access request is received, to verify validity of the role of the application entity.

12. A computer implemented method for accessing to resources on a service entity in Internet Of Thing (IOT), comprising:

transmitting an access request for a target resource on the service entity, wherein the access request is initiated by an application entity;

waiting during verification of the access request; and receiving a response indicating whether to allow accessing the target resource;

wherein the access request includes an identifier for triggering verification of a service state of the target resource to determine whether to allow the application entity to access the target resource based on a service operating state corresponding to the target resource, and the validity of the service state is determined based on a service state identifier.

13. The method according to claim 12, wherein the identifier is used for triggering comparison of saved information of the service state related to the target resource with a preset service information rule by a party which receives the access request, to determine validity of the service state of the target resource.

14. The method according to claim 13, wherein the service information rule comprises information corresponding to various states of the service.

15. The method according to claim 13, wherein the service information rule comprises information of target users of the service.

16. The method according to claim 12, wherein the access request includes an identifier for triggering verification of a role of a sender of the access request.

17. The method according to claim 12, further comprising:

transmitting a request for creating access control policy resource, wherein the request for creating access control policy resource includes a request for adding an access control service state identifier when creating the access control policy resource, to indicate whether it is necessary to verify validity of the service state of the target resource.

18. The method according to claim 12, further comprising:

transmitting a request for creating a resource related to a role, wherein the request for creating a resource related to a role includes a request for adding a service state identifier when creating the resource related to a role, to indicate whether it is necessary to verify validity of the service state related to the target resource.

19. A resource access control device for controlling access to resources on a service entity in Internet Of Thing (IOT), comprising:

a receiver, configured to receive a access request initiated by an application entity for a target resource on the service entity;

a processor, configured to perform verification for the access request, and determine whether to allow the application entity to access the target resource based on a service operating state corresponding to the target resource wherein verification for the access request includes: determining validity of a service state related to the target resource based on a service state identifier; and a transmitter, configured to transmit a response of whether to allow the application entity to access the target resource according to a result of the verification for the access request.

* * * * *